(12) United States Patent
Leonetti et al.

(10) Patent No.: US 11,867,893 B2
(45) Date of Patent: Jan. 9, 2024

(54) SCATTERING-ASSISTED SUPER-LOCALIZATION MICROSCOPY METHOD AND RELATIVE APPARATUS

(71) Applicants: CRESTOPTICS S.P.A., Rome (IT); FONDAZIONE ISTITUTO ITALIANO DI TECNOLOGIA, Genoa (IT)

(72) Inventors: Marco Leonetti, Genoa (IT); Giuseppe Antonacci, Genoa (IT); Raino Ceccarelli, Rome (IT)

(73) Assignee: DISRUPTIVE TECHNOLOGICAL ADVANCES IN LIFE SCIENCE S.R.L., Rome (IT)

( * ) Notice: Subject to any disclaimer, the term of this patent is extended or adjusted under 35 U.S.C. 154(b) by 734 days.

(21) Appl. No.: 17/040,301

(22) PCT Filed: Mar. 26, 2019

(86) PCT No.: PCT/IB2019/052442
§ 371 (c)(1),
(2) Date: Sep. 22, 2020

(87) PCT Pub. No.: WO2019/186393
PCT Pub. Date: Oct. 3, 2019

(65) Prior Publication Data
US 2021/0063721 A1 Mar. 4, 2021

(30) Foreign Application Priority Data
Mar. 27, 2018 (IT) .................. 102018000003984

(51) Int. Cl.
*G02B 21/36* (2006.01)
*G01N 21/64* (2006.01)
*G02B 21/16* (2006.01)

(52) U.S. Cl.
CPC ....... *G02B 21/365* (2013.01); *G01N 21/6458* (2013.01); *G02B 21/16* (2013.01)

(58) Field of Classification Search
CPC ... G02B 21/365; G02B 21/16; G01N 21/6458
See application file for complete search history.

(56) References Cited

U.S. PATENT DOCUMENTS

| 8,552,402 | B2 * | 10/2013 | Ye | G01N 21/6458 250/459.1 |
| 10,244,940 | B2 * | 4/2019 | Bublitz | G01B 9/02004 |
| 11,092,793 | B2 * | 8/2021 | Bianchini | G01N 21/6458 |

OTHER PUBLICATIONS

Search Report and Written Opinion for International Application No. PCT/IB2019/052442 dated Jul. 4, 2019.
(Continued)

*Primary Examiner* — Dhaval V Patel
(74) *Attorney, Agent, or Firm* — Pearne & Gordon LLP

(57) ABSTRACT

Fluorescence microscopy method comprising: illuminating a scattering sample with a coherent excitation light beam having a wavefront with an initial configuration for exciting fluorescent emitters in the scattering sample; acquiring an initial image; selecting target pixels in an area of the initial image; optimising the initial configuration of the wavefront for each target pixel for decreasing the speckle grain size and obtaining a final image; subtracting the initial image from the final image for each target pixel, obtaining an image; fitting the image with a Gaussian function with free center coordinates for each target pixel; generating an image containing a Gaussian distribution centered at the coordinates and intensity, and with a waist equal to an average size S of speckle grain of the scattering sample, for each target pixel; and generating a final image of the sample by summing the images of the target pixels.

9 Claims, 6 Drawing Sheets

(56) References Cited

OTHER PUBLICATIONS

Zeddin et al, "PSF shaping using adaptive optics for three-dimensional single-molecule super-resolution imaging and tracking", Optics Express, vol. 20, No. 5, Feb. 13, 2012, pp. 4957-4967, XP055052832, ISSN: 1094-4087, DOI: 10.1364/0E.20.004957.

Thompson et al., "Extending Microscopic Resolution with Single-Molecule Imaging and Active Control", Annual Review of Biophysics, vol. 41, Jun. 9, 2012, pp. 321-342, XP055505598, ISSN: 1936-122X, DOI: 10.1146/annurev-biophys-050511-102250.

Ji et al, "Adaptive optics via pupil segmentation for high-resolution imaging in biological tissues", Nature Methods, vol. 7, No. 2, Dec. 27, 2009, pp. 141-147, XP055138052, ISSN: 1548-7091, DOI: 10.1038/nmeth.1411.

Deschout et al., "Precisely and accurately localizing single emitters in fluorescence microscopy", Nature Methods, vol. 11, No. 3, Feb. 27, 2014, pp. 253-266, XP055447270, New York ISSN: 1548-7091, DOI: 10.1038/nmeth.2843.

Tang, et al., "Superpenetration optical microscopy by iterative multiphoton adaptive compensation technique", PNAS, vol. 109, No. 22, May 29, 2012, pp. 8434-8439, www.pnas.org/cgi/doi/10.1073/pnas.1119590109.

Betzig, et al., "Imaging Intracellular Fluorescent Proteins at Nanometer Resolution", Science, vol. 313, Sep. 15, 2006, pp. 1642-1646, www.sciencemag.org.

Hell, et al., "Breaking the diffraction resolution limit by stimulated emission: stimulated-emission-depletion fluorescence microscopy", Optics Letters, vol. 19, No. 11, Jun. 1, 1994, pp. 780-782.

Schermelleh, et al., "A guide to super-resolution fluorescence microscopy", The Journal of Cell Biology, vol. 190, No. 2, 2010, pp. 165-175.

Leung, et al., "Review of Super-Resolution Fluorescence Microscopy for Biology", Applied Spectroscopy, focal point review, vol. 65, No. 9, 2011, pp. 967-980.

Pawley, "Fundamental Limits in Confocal Microscopy", Handbook of Biological Confocal Microscopy, Third Edition, edited by James B. Pawley, Springer Science+Business Media, LLC, New York, Chapter 2, pp. 20-42, (2006).

Betzig, et al., "Near-Field Optics: Microscopy, Spectroscopy, and Surface Modification Beyond the Diffraction Limit" Science, vol. 257, Jul. 10, 1992, pp. 189-196, http://science.sciencemag.org/content/257/5067/189.

Gustafsson, "Surpassing the lateral resolution limit by a factor of two using structured illumination microscopy", Journal of Microscopy, vol. 198, Pt 2, May 2000, pp. 82-87.

Park, et al., "Subwavelength light focusing using random nanoparticles", Nature Photonics, vol. 7, Jun. 2013, www.nature.com/naturephotonics, pp. 454-458.

Van Putten, et al., "Scattering Lens Resolves Sub-100 nm Structures with Visible Light", Physical Review Letters, vol. 106, No. 19, May 13, 2011, pp. 193905-1-193905-4.

Vellekoop, et al., "Exploiting disorder for perfect focusing", Nature Photonics, vol. 4, May 2010, pp. 320-322, www.nature.com/naturephotonics.

Vellekoop, et al., "Focusing coherent light through opaque strongly scattering media", Optics Letters, vol. 32, No. 16, Aug. 15, 2007, pp. 2309-2311.

Di Battista, et al., "Enhanced adaptive focusing through semi-transparent media", Scientific Reports, vol. 5, No. 17406, DOI: 10.1038/srep17406, www.nature.com/scientificreports, Dec. 1, 2015, pp. 1-8.

Vellekoop, et al., "Phase control algorithms for focusing light through turbid media", Optics Communications, vol. 281, 2008, pp. 3071-3080.

Akbulut, et al., "Focusing light through random photonic media by binary amplitude modulation", Optics Express, vol. 19, No. 5, Feb. 28, 2011, pp. 4017-4029.

* cited by examiner

SCATTERING-ASSISTED SUPER-LOCALIZATION MICROSCOPY METHOD AND RELATIVE APPARATUS

CROSS-REFERENCE TO RELATED APPLICATIONS

This is the National Stage of PCT international application PCT/IB2019/052442, filed on Mar. 26, 2019, which claims the priority of Italian Patent Application No. 102018000003984, filed Mar. 27, 2018, both of which are incorporated herein by reference in their entirety.

The present invention relates to a method for increasing the optical resolution of a fluorescence microscopy apparatus, on opaque or scattering sample, without increasing the apparatus complexity, in a simple, reliable, adaptable, and economical way.

Such a method exploits the light scattered by the sample itself to increase the effective numerical aperture of the microscopy apparatus overcoming the resolution of the used light collection optical system, i.e. the objective. Such a method is based on the wavefront phase and/or amplitude modulation of an exciting coherent light beam on a scattering sample for building constructive interference out of light beams scattered by the sample, causing a tight focus, and on the control of the light scattered by the sample. In particular, the method according to this invention maximizes the intensity of a fluorescent signal emitted by fluorescent proteins of a biological tissue and assembles information obtained from the fluorescence generated by multiple foci generated in different position across the sample after repeated optimizations into an image whose resolution is not limited by the illumination and collection optics.

Further, this invention relates to a fluorescence microscopy apparatus with increased optical resolution.

Although the presented invention is mainly oriented towards the investigation of biological samples where the experimental conditions require the fluorescence signal collection optics to be positioned distant from samples, it must be borne in mind it may be applied to fluorescence signal generated by other scattering samples, in other fields such as for instance astronomic and atmospheric, or survey at distance for security or civil application, still remaining within the scope of protection as defined by the annexed claims.

The diffraction limit, as formulated by Abbe and Rayleigh, states that the maximum resolution achievable by a lens is defined by the numerical aperture, NA. The larger the solid angles of the illumination and collection optics, the higher the spatial resolution achievable by an imaging system. Papers of Tang et al. "Superpenetration optical microscopy by iterative multiphoton adaptive compensation technique", *Proceedings of the National Academy of Sciences* 109, 8434-8439 (2012) and of Ji N. et al "Adaptive optics via pupil segmentation for high-resolution imaging in biological tissues", *Nature methods* 7, 141-147 (2010) disclose how to correct optical aberrations with adaptive optics for obtaining the theoretical resolution of a real lens. Such as theoretical resolution may be bypassed by super resolution techniques, as disclosed by papers of Betzig, E. et al. "Imaging intracellular fluorescent proteins at nanometer resolution." *Science* 313, 1642-1645 (2006), of Hell, S. W. & Wichmann, N. "Breaking the diffraction resolution limit by stimulated emission: stimulated-emission-depletion fluorescence microscopy." *Optics letters* 19, 780-782 (1994), of Schermelleh, L. et al "A guide to super-resolution fluorescence microscopy." *The Journal of cell biology* 190, 165-175 (2010), di Leung, B. O. & Chou, K. C. "Review of super-resolution fluorescence microscopy for biology." *Applied spectroscopy* 65, 967-980 (2011), of Pawley, N. B. "*Fundamental Limits in Confocal Microscopy*", 20-42 (Handbook of Biological Confocal Microscopy, Third Edition, edited by James B. Pawley, Springer Science+Business Media, LLC, New York, 2006), of Betzig, E. & Trautman, N. K. "Near-field optics: microscopy, spectroscopy, and surface modification beyond the diffraction limit." *Science* 257, 189-196 (1992), and of Gustafsson, M. G. "Surpassing the lateral resolution limit by a factor of two using structured illumination microscopy." *Journal of microscopy* 198, 82-87 (2000).

Another example of fluorescence microscopy method and a relative apparatus of the prior art is described in the paper of Izeddin, I. et al. "PSF shaping using adaptive optics for three-dimensional single-molecule super-resolution imaging and tracking." *Optics Express* Vol. 20, Issue 5, pp. 4957-4967 (2012).

The suggested solutions suffer from several drawbacks. First, the maximum resolution, which may be achieved through conventional optical microscopy apparatus, requires a lens positioned close to the sample, which may be a severe limitation in non-invasive and in-vivo measurements. Moreover, a high numerical aperture NA is an essential ingredient in most present microscopies yet aiming to bypass the diffraction limit, such as confocal, near field, structured illumination, stimulation emission depletion, or photo-activated localization microscopy. Finally, the scattering, for example from opaque tissue, is usually seen as an obstacle for these microscopies perfect focusing, degrading the wavefront shape by optical aberrations and limiting the achievable resolution. For example, the most vertebrate tissues (including humans) appear optically opaque so that a coherent light beam entering a portion of skin is diffused into many uncorrelated optical paths and after a certain distance (the transport mean free path, $\ell$) their travel direction is completely randomized.

It is an object of this invention to overcome the described drawbacks, allowing in a reliable, simple and economical way to increase the optical resolution of a fluorescence microscopy apparatus, independently of the numerical aperture NA of the microscope optics and in a non-invasive way.

It is specific subject matter of the present invention a fluorescence microscopy method comprises the following steps:

A. illuminating a scattering sample including one or more fluorescent emitters with a coherent excitation light beam having a wavefront with a first initial configuration $C^1$ for exciting said one or more fluorescent emitters comprised in the scattering sample;

B. acquiring a first initial image $F^1$ corresponding to a background image $F^1 = F_B$ of the scattering sample, through a pixel imaging unit, obtaining a speckle grain image;

C. selecting M target pixels $P_N$, with N=1, ..., M, of coordinates $[x_N, y_N]$ belonging to an area of the first initial image $F^1$ having fluorescence signals of at least one fluorescent emitters, each one of the M target pixels $P_N$ having a first initial intensity $I_{PN}^1$;

D. optimising the first initial configuration of the wavefront for each one of the M target pixels $P_N$, for decreasing the speckle grain size of the first initial image $F^1$ and obtaining a final image $F^{fin}(I_{PN}^{max})$ of the scattering sample with a local maximum $I_{PN}^{max}$ of the fluorescence signal corresponding to a maximum intensity of the target pixels $P_N$;

E. subtracting the first initial image $F_B$ of background, obtained at step B, from the final image $F^{fin}(I_{PN}^{max})$, obtained at step D, for each one of the M target pixels $P_N$, obtaining an image $F_{speckle(PN)}$ having only fluorescent signals coming from a speckle grain located at pixel $[X_N, y_N]$ with intensity $I_{PN}^{speckle}$, for each one of the M target pixels $P_N$;

F. fitting the image $F_{speckle(PN)}$, obtained at step E, with a Gaussian function with free center coordinates, for each one of the M target pixels $P_N$, thereby obtaining coordinates $(X_N, Y_N)$ and intensity $I_N$ in a xy plane;

G. generating an image $F_N$ containing a Gaussian distribution centered at coordinates $(X_N, Y_N)$ and with intensity $I_N$, obtained at step F, and with a waist equal to an average size S of speckle grain of the scattering sample, for each one of the M target pixels $P_N$;

H. generating a final image of the sample by summing the M images $F_N$ obtained at step G, for each one of the M target pixels $P_N$.

According to another aspect of the invention, step D may comprise, for each one of the M target pixels $P_N$, the following sub-steps:

D.1—set the first initial configuration $C^1$ of the wavefront as a reference configuration $C^1=C^{ref}$ of the wavefront, the first initial image $F^1$ as a reference image $F^1=F^{ref}$, and a first intensity $I_{PN}^1$ at the target pixel $P_N$ of the first initial image $F^1$ as a reference intensity $I_{PN}^1=I_{PN}^{ref}$ at the target pixel $P_N$;

D.2—repeating T times, with T>1, the following cycle of substeps:

D.2.1—varying the reference configuration $C^{ref}$ of the wavefront through an amplitude and/or phase modulation unit (10) so as to obtain an i-th configuration $C^i$ of the wavefront;

D.2.2—acquiring an i-th image $F^i$ with an i-th intensity $I_{PN}^i$ at the target pixel $P_N$;

D.2.3—checking whether the i-th intensity $I_{PN}^i$ value at the target pixel $P_N$ is greater than the reference intensity $I_{PN}^{ref}$ thereby:

if $I_{PN}^i > I_{PN}^{ref}$, then the i-th configuration $C^i$ of the wavefront obtained at step D.2.1 is accepted as the reference configuration $C^{ref}$ of the wavefront, i.e. $C^{ref}=C^i$, and $F^{ref}=F^i$ and $I_{PN}^{ref}=I_{PN}^i$ are set, else if $I_{PN}^i > I_{PN}^{ref}$, then the i-th configuration $C^i$ of the wavefront obtained at step D.2.1 is not accepted, and the reference configuration $C^{ref}$ of the wavefront before the variation performed at step D.2.1 is restored;

D.3—setting the reference image $F^{ref}$ as the final image $F^{ref}=F^{fin}(I_{PN}^{max})$ and the reference intensity $I_{PN}^{ref}$ as a local maximum $I_{PN}^{max}$ of florescence signal at the target pixel $P_N$.

According to a further aspect of the invention, said amplitude and/or phase modulation unit may be a digital micromirror device comprising a p×q matrix of micromirrors and the step D.2.1 is implemented by varying the orientation of Q≥1 micromirrors of the digital micromirror device, thereby Q≤p×q, wherein each micromirror can take on V>2 orientations, so that T=V×Q.

According to an additional aspect of the invention, said average size S of the speckle grain of the scattering sample may be set equal to $\lambda/2n$, where is a wavelength of the excitation light and n is a refractive index of the sample.

According to another aspect of the invention, said average size S of the speckle grain of the scattering sample may be computed by measures of sample image intensity autocorrelation, as a function of distance.

According to a further aspect of the invention, the method may be a step for de-magnifying the coherent excitation light beam, before step A.

It is another specific subject-matter of the present invention a fluorescence microscopy apparatus comprising a wavefront modulation unit, configured to receive and to amplitude and/or phase modulate an excitation light beam, the apparatus being configured to illuminate a sample by the excitation light beam modulated by the wavefront modulation unit, wherein the apparatus further comprises an imaging unit, configured to receive and acquire a fluorescent beam emitted from the sample, and a control unit connected to the wavefront modulation unit and to the imagining unit, wherein the apparatus is configured to implement the fluorescence microscopy method described above, thereby the control unit is configured to control the wavefront modulation unit according to step D, based on the fluorescent beam acquired by the imaging unit.

According to another aspect of the invention, said wavefront modulation unit may be a Digital Micromirror Device, DMD.

According to a further aspect of the invention, the apparatus may be configured to implement the method described above, comprising a coherent excitation light beam de-magnifying unit.

The method according to the present invention uses optimization algorithms to shape an amplitude and phase configuration of an excitation coherent light beam wavefront, in order to maximize the fluorescent signal emitted by an emitter located on a surface or embedded into a sample. In the following of the description reference will be indifferently made to optimization and shaping of the amplitude and phase configuration of a light beam wavefront, meaning one or more variation in amplitude and/or phase of the wavefront aimed to maximise a fluorescence signal emitted by an emitter.

The signal enhancement is due to an enhancement of the light intensity of a speckle grain, which is located at the target emitter (enhanced speckle grain).

In the description and the attached claims, reference will be made to speckle meaning a dotted figure obtained as a coherent light wave is reflected by a scattering media and a speckle grain is an intensity maximum, which is located in the speckle field. Once the optimization is completed, the signal of the speckle grain (obtained by subtracting the non-optimized fluorescence to the optimized image) is super-localized by a Gaussian fit of the data. By generating multiple foci, i.e. enhanced speckle grains, across the field of view and aggregating the information from all the contributions, a complete image of the sample is reconstructed.

The advantages of the method according to the invention over the prior art solutions are numerous and significant The method according to the present invention relies on the fact that the size of an excitation light beam focus, i.e. a light focus, obtained by shaping an amplitude and phase configuration of the wavefront close or inside a scattering sample, is not limited by the illumination and collection optics numerical aperture NA, but is defined by the size of the enhanced speckle grain of the sample. In other words, it is obtained a light focus whose size, after shaping the amplitude and phase configuration of the wavefront, is equal to those of the speckle grain. Hence the independence of spatial resolution from the illumination/collection optics of the microscopy apparatus. The average size S of a speckle grain is equal to a $\lambda/2n$ as disclose in Goodman, N. W. "Speckle phenomena in optics: theory and applications" (Roberts and Company Publishers, 2007), where $\lambda$ is the wavelength of the incident light and n is the refraction index of the media. Recently, the size S of a speckle grain at the surface of high scattering media was measured to be less than 100 nanometer, as shown in Park, N.-H. et al. "Sub-wavelength light focusing using random nanoparticles." *Nature photonics* 7, 454-458 (2013) and in Van Putten, E. et al. "Scattering lens resolves sub-100 nm structures with visible light." *Physical review letters* 106, 193905 (2011).

In other words, the limiting numerical aperture for the method according to the invention is the one defined by k-vectors generated by the sample through the scattering rather than those defined by the illumination and collection optics. This allows advantageously achieving a sub-diffraction resolution a scattering sample, larger up to six time the theoretical diffraction limit.

A second advantageous aspect of the method according to the invention is that, as the resolution is independent of the microscopy apparatus optics, the method according to the invention allows working with optics having long work distance and then not directly connected to the investigated samples. In other words, the control of the light scattered by a sample can be a powerful tool to increase the resolution, especially in those cases where a high resolution is required together with a long working distance. Moreover, to implement the method it is possible to exploits quite simply experimental setup by combining features common in most optical microscopes, such as photo cameras and interference filters, with a spatial light modulator. This, advantageously, makes the method extremely versatile as it can be applied to any fluorescent imaging system.

Finally, as the method according to the invention allows obtaining high resolution without the need of high power light source, a further advantage is that of being able to use it to investigate samples with low damage thresholds, and it may be easily implemented to in vivo investigation of sensible tissues such as human retina.

The present invention will be now described, by way of illustration and not by way of limitation, according to its preferred embodiments, by particularly referring to the Figures of the annexed drawings, in which:

FIG. 1 shows a schematic of (a) preferred embodiment of an apparatus configured to implement the method according to the invention, (b) a schematic representing optics driven resolution limit in a standard microscopy apparatus, and (c) schematic representing a resolution limit depending on the size S of a speckle grain obtained by the method according to the invention;

FIG. 2 shows the sizes of a focus of an excitation the size of an excitation coherent light beam focus impinging a polished glass surface (FIG. 2a) and a known scattering medium (FIG. 2b) respectively, experimentally obtained implementing a shaping the amplitude and phase configuration of the excitation light beam wavefront of a preferred embodiment of the method according to the invention, the related intensity profiles (FIG. 2c) and the related beam waist values as a function of the numerical aperture NA;

FIG. 3 schematically shows some steps of the preferred embodiment of the method implemented by the apparatus of FIG. 1 to obtain high-resolution images of a first known scattering sample;

Figure 1:
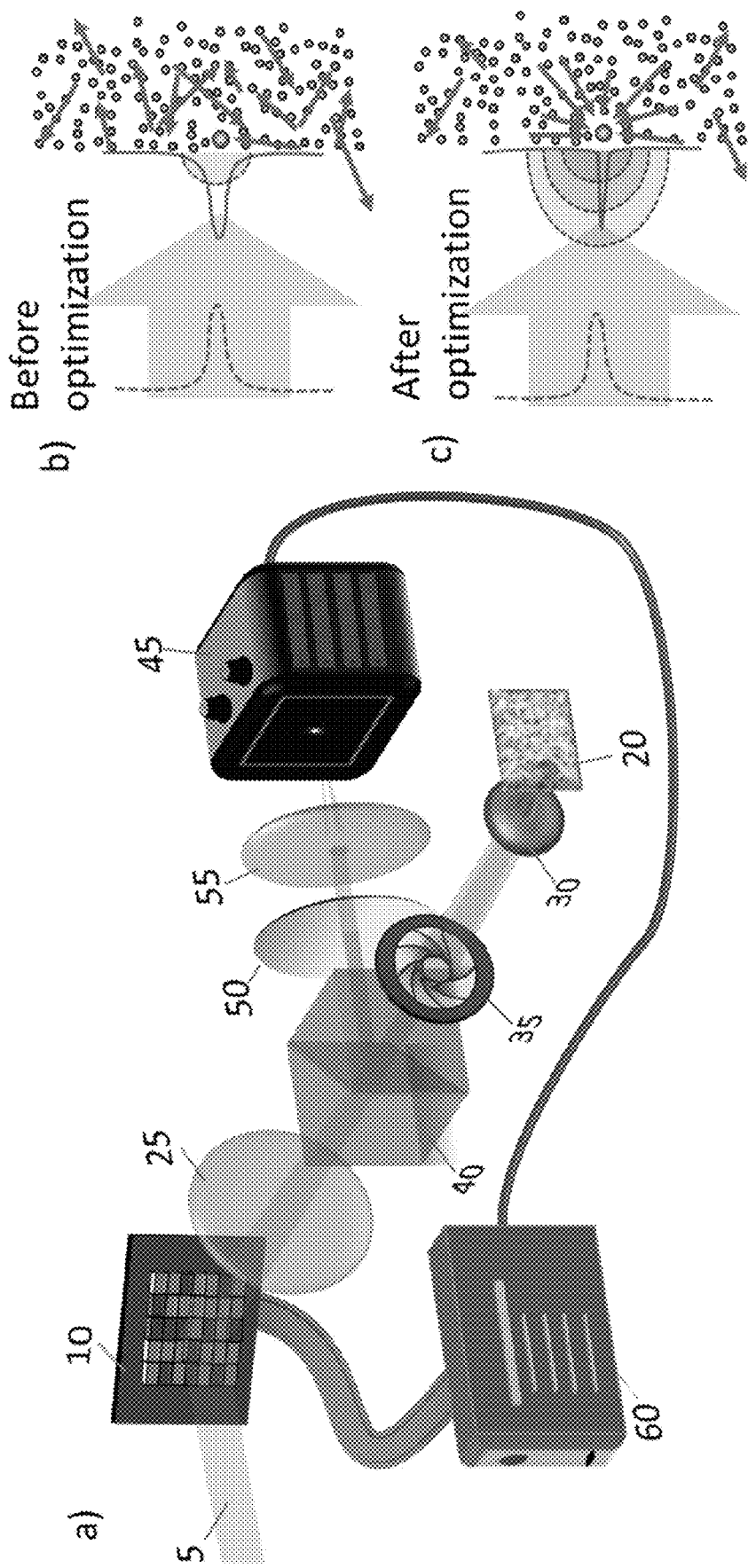

Referring to FIG. 1*a*, an apparatus 100 configured to implement the method according to the invention comprises a source (not shown in FIG. 1) emitting an exciting coherent light beam 5 with a wavelength $\lambda$ such as to excite fluorescent emitters in a sample 20, for example a monochromatic laser beam, optionally with a 532 nanometer (nm) wavelength. The apparatus 100 further comprises a demagnification unit not shown in figure to demagnify the beam 5, such as for example a Galilean telescope comprising two lenses with a focal ratio $f_1/f_2$ that is equal to demagnification. The apparatus 100 comprising a unit 10 of modulation of amplitude and/or phase configuration of a light beam wavefront, configured to receive and modulate in amplitude and/or phase the excitation coherent light beam 5.

In the preferred embodiment of the apparatus 100, such a unit 10 of modulation of amplitude and/or phase configuration of a light beam wavefront is a Digital Micromirror Device DMD. Other embodiments of the present invention may include different units 10 of modulation of amplitude and/or phase configuration of a light beam wavefront such as for example light spatial modulator and deformable mirrors. Downstream of the unit 10 of modulation, following the path of the light beam 5 from the source to the sample 20, the apparatus 100 comprises a lens 25 and an optical objective 30, that may also be a simple lens, for focusing the modulated excitation coherent light beam 5 coming out from the unit 10 of modulation on the sample 20. Moreover, the optical objective 30 collects the light coming from the sample 20, including a fluorescent emitted component (i.e. a fluorescent beam emitted by the sample 20) and a reflected component of the exciting light beam 5. The numerical aperture NA of the optical objective 30 is controlled through a diaphragm 35. The apparatus 100 further comprises a beam splitter driven the light coming out from the sample towards an imaging unit 45, such as for example a CMOS or CCD camera. A spectral filter 50 removes the reflected component of the exciting light beam 5 form the light coming out from the sample, so that only the fluorescence emitted component reaches the imaging unit 45 after passing through an optical group 55, for example an eyepiece. In the preferred embodiment of the present invention, the spectral filter 50 is an interferential filter. A control unit 60 is connected to the unit 10 of modulation of amplitude and/or phase configuration of a light beam wavefront and to the imaging unit 45. Such a control unit 60 master the unit 10 of modulation of amplitude and/or phase configuration of the wavefront depending on the images obtained from the imaging unit 45, i.e. through a feedback loop, as will be described in the following in particular relating to FIGS. 2 and 3.

FIGS. 1*b* and 1*c*, show a schematic of the principle underlying the method according to the invention. While the microscope resolution is usually determined by the focusing/collection optics (FIG. 1*b*), the signal of a fluorescent emitter into a scattering sample may be exploited to overcome the collection optics limitation. In such a case the resolution is limited by the size S of the speckle gain on the surface of the sample (FIG. 1*c*).

For the sake of simplicity, in the following description and in the claims we will use the term "configuration" of a wavefront meaning an amplitude and phase configuration of a wavefront, wherein the amplitude and I or phase may be modulated or not.

In the method according to the invention, an excitation light beam 5 wavefront with a first initial configuration $C^1$ not modulated impinges the sample 20, and a first initial image $F^1$, or background frame di $F^1=F_B$, of the sample 20 is acquired by the imaging unit 45. An interest area of the image formed by the unit 45 where there are fluorescent signals, inside which M pixels $P_N$ are chosen, with N=1, . . . , M, whose coordinates xy on an image plane are $[x_i, y_i]$.

Next, an optimization step of the configuration of the wavefront of the excitation light beam 5 is implemented, to maximize the fluorescent signal coming from the surface of the sample 20 generating an enhanced speckle grain. Recently, optimization algorithm of the wavefront has been implemented to focus the light on a single grain of a disordered speckle scheme, as shown for example by papers of Vellekoop, I. M., et al. "Exploiting disorder for perfect focusing." *Nature photonics* 4, 320-322 (2010), of Vellekoop, I. M. et al. "Focusing coherent light through opaque strongly scattering media." *Optics letters* 32, 2309-2311 (2007), and of Di Battista, D., et al. "Enhanced adaptive focusing through semitransparent media." *Scientific reports* 5, 17406 (2015). A light focus obtained by such algorithms is made through constructive interferences by many different optical paths, shaping the configuration of the excitation light beam wavefront, i.e. handling the phase or the amplitude of the excitation beam wavefront, by spatial light modulator such as micromirror digital devices by a feedback loop, as shown for example by papers of Vellekoop, I. & Mosk, A. "Phase control algorithms for focusing light through turbid media." *Optics communications* 281, 3071-3080 (2008) and of Akbulut, D. et al. "Focusing light through random photonic media by binary amplitude modulation." *Optics express* 19, 4017-4029 (2011). In the preferred embodiment of the method according to the invention, the optimization of the wavefront of the excitation light beam comprises a preliminary step of demagnification of the beam 5 in such a way to illuminate an active area of the DMD unit 10 of modulation of a surface homogenously. In other words, the sample is illuminated y a demagnified image of the DMD unit 10 of modulation illuminated by the beam 5. Next, one of the M pixels, $P_N$ con N=1 . . . M, is chosen as target pixel and the configuration of the wavefront impinging the sample 20 is varied by the unit 10 of modulation until maximize the intensity of a fluorescent signal related to the pixel as detailed described in the following.

The first initial image $F^1$ is set as a target pixel $P_N$ reference image $F^{ref}$, a target pixel $P_N$ first intensity $I_{PN}^1$ of the first initial image $F^1$ is set as a target pixel $P_N$ reference intensity $I_{PN}^{ref}$ and the first initial configuration $C^1$ of the wavefront is set as a reference configuration $C^1=C^{ref}$. The DMD unit 10 of modulation is assembled in pxq segments or micromirrors, each one being able to assume an orientation between a plurality of V=2 orientations. In further embodiments of the invention, each micromirror can assume more than two orientation, i.e. V≥2. The orientation of a randomly chosen micromirror m of DMD is varied so that the wavefront impinging the sample assumes a second configuration $C^2$ different from the first one $C^2 \neq C^1$ and a second image $F^2$ is acquired. A target pixel $P_N$ second intensity $I_{PN}^2$ of the second image $F^2$ is compared to the target pixel $P_N$ reference intensity $I_{PN}^{ref}$. If the second intensity $I_{PN}^2$ is larger than the reference intensity $I_{PN}^{ref}$, the orientation variation of the micromirror m, and therefore the second configuration of the wavefront, is accepted. Thus, we assume as the reference intensity the greater intensity between them, namely $I_{PN}^{ref}=I_{PN}^2$, as the reference configuration of the wavefront the one for which we have the greater intensity, namely $C^{ref}=C^2$, and as reference image the image where the target pixel $P_N$ intensity is larger, namey $F^{ref}=F^2$. If the second intensity $I_{PN}^2$ is less than the reference intensity $I_{PN}^{ref}$, the variation is not accepted and the previous orientation of the micromirror m, and therefore the previous configuration of wavefront, is restored. In the latter case, the reference intensity and the reference configuration remain unchanged, together with the reference image.

Subsequently, the orientation of a randomly chosen micromirror n, with n≠m, is varied so that the wavefront impinging the sample assumes a third configuration $C^3$ and a third image $F^3$ is acquired. A target pixel $P_N$ third intensity $I_{PN}^3$ of the third image $F^3$ is compared to the reference intensity $I_{PN}^{ref}$. If the third intensity $I_{PN}^3$ is larger than the reference intensity $I_{PN}^{ref}$, the orientation variation of the micromirror n, and therefore the third configuration $C^3$ of the wavefront, is accepted. Thus, we assume as the reference intensity the greater intensity between them, namely $I_{PN}^{ref}=I_{PN}^3$, as the reference configuration of the wavefront the one for which we have the greater intensity, namely $C^{ref}=C^3$, and as reference image the image where the target pixel $P_N$ intensity is larger, namely $F^{ref}=F^3$. If the third intensity $I_{PN}^3$ is less than the reference intensity $I_{PN}^{ref}$, the variation is not accepted and the previous orientation of the micromirror n, and therefore the previous configuration of wavefront, is restored. In the latter case, the reference intensity and the reference configuration remain unchanged.

The above-described procedure is repeated for a number Q of micromirrors of the DMD unit 10 of modulation for each target pixel of the area of interest (namely, for each one of the M target pixel $P_N$). In the preferred embodiment of the method, Q is greater than or equal to 60. Overall, for each target pixel, V×Q configurations of the excitation light beam wavefront impinges on the sample.

The step of optimization of the configurations of wavefront decreases the size S of a speckle grain of a scattering sample image, obtaining a reduced size speckle grain, and make it independent of the optical aperture of the focusing optics.

The inventors have carried out an experiment to observe the coherent light scattered by a not scattering sample and that scattered by a scattering sample. The experiment has been carried out using the apparatus of FIG. 1 without the spectral filter 50 and with the diaphragm 35 placed before the beam splitter 40 so as not to influence the resolution of the collection optics.

Figure 2:
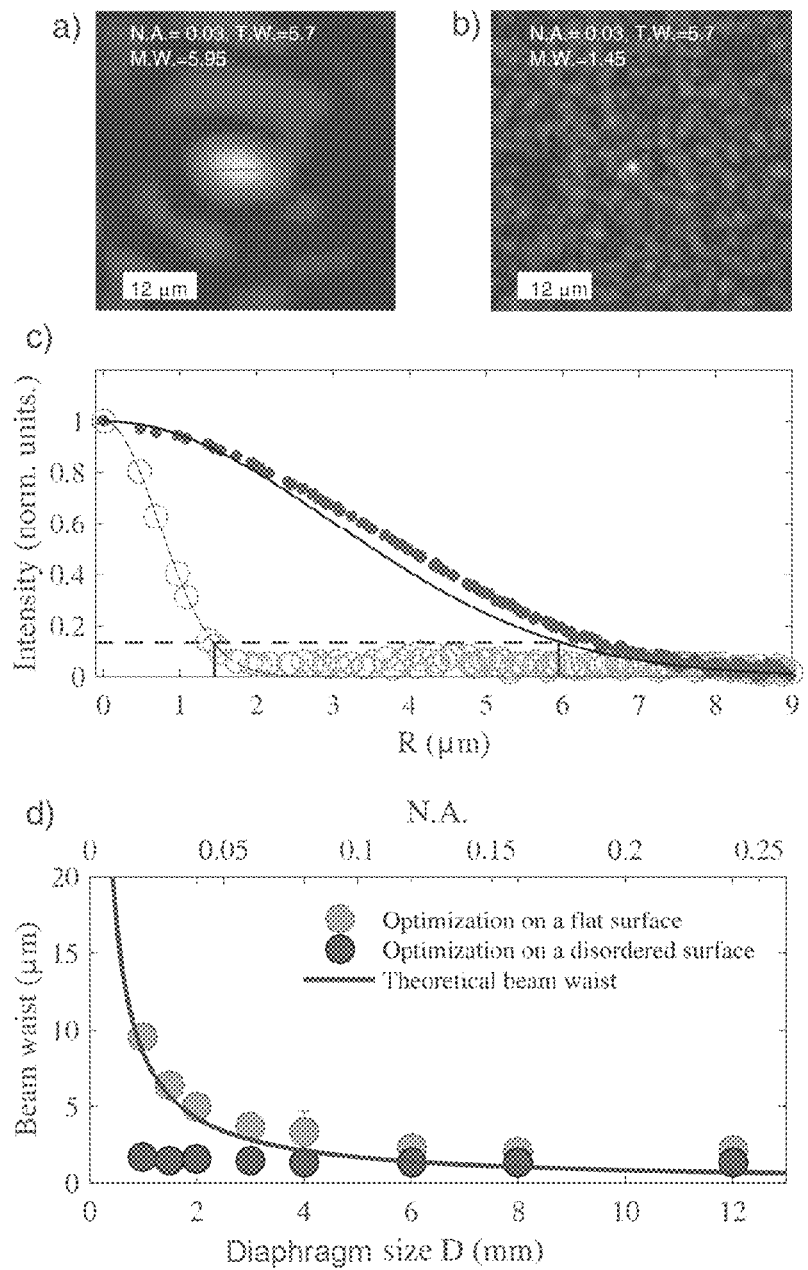

FIG. 2 shows the images of focus of an excitation coherent light beam 5 obtained at the end of the above described optimization step of the configuration of the wavefront on a not scattering sample and on a scattering sample. In particular, for a same value, equal to 0.03, of the numerical aperture NA of the focusing optics, determined by the diaphragm 35, FIG. 2a shows an image of the light focus obtained on a sample of polished glass (not scattering sample), while FIG. 2b shows an image of the light focus obtained on a 60 μm thick layer of commercial $TiO_2$ titanium dioxide (Product 224227 by SIGMA ALDRICH) prepared in a suspension of ethanol and deposited on a slide (scattering sample). The layer thickness has been adjusted exploiting a feeler gauge.

It can be observed that the average size S of a speckle grain of the scattering sample is about λ/2n=150 nm. The optimization of the configuration of wavefront was performed using a DMD Vialux discovery 4100 divided into 11×11 square segments each with a side size of 70 micrometers (μm). In the experiment, the exposure time for each configuration of wavefront on a target pixel, ranges from 2 to 40 microseconds (μs), and the step of optimization of the configuration of wavefront was performed for 60 micromirrors for each target pixel. FIGS. 2a and 2b show that the size of a light focus, obtained by step of optimization of the configuration of wavefront, on a smooth surface is much larger than the size obtained on a scattering surface. FIG. 2c shows the intensity profiles, in arbitrary units, of the light focus of FIG. 2a (solid dot) and of the light focus of FIG. 2b (empty dots), from which the excitation light beam 5 measured waist (MW) values are obtained, by Gaussian fit (continuous lines), equal to 5.95 on the polished glass sample and 1.45 on the scattering sample, with respect to a same theoretical waist (TW) of 5.7.

In addition, the inventors carried out the same experiment when the numerical aperture NA of the apparatus varied, adjusting the diameter D of the diaphragm. FIG. 2d shows the sizes in micrometers (μm) of the waist of the beam 5 on the polished glass sample and on the scattering sample as a function of the diameter D of the diaphragm and they have been compared with the expected theoretical values (continuous line). It is evident that the size of the light focus on the scattering sample is independent of the numerical aperture NA.

At the end of the optimization step of the configuration of wavefront, a final image $F^{fin}(I_{PN}^{max})$ is obtained with a local maximum fluorescence emission for the target pixel $P_N$ inside the area of interest, where $I_{PN}^{max}$ is just the maximum intensity in the target pixel $P_N$ obtained at the end of the optimization step of the configuration of wavefront, due to the configuration of wavefront determined at the end of the optimization.

Subsequently, the method continues with a step of subtraction of the background image $F_B$, previously obtained with the unmodulated excitation light beam, optionally demagnified, from the final image $F^{fin}(I_{PN}^{max})$ obtained from the step of optimization of the configuration of wavefront, so as to obtain an image $F_{speckle(PN)}$ containing only light generated (i.e. containing exclusively fluorescence signals coming) from an underlying speckle grain, namely contained in the pixel $[x_N, y_N]$, with intensity $I_{PN}^{speckle}$. In other words, an image of the sample is obtained in which there is a single illuminated spot, corresponding to an optimized speckle, namely a speckle with intensity larger than the surrounding speckle intensities. The underlying speckle grain appears on the imaging unit 45 with a size larger than its real extension due to the limited optical resolution of the collection optics that makes a convolution (see the image of FIG. 3a).

Figure 6:
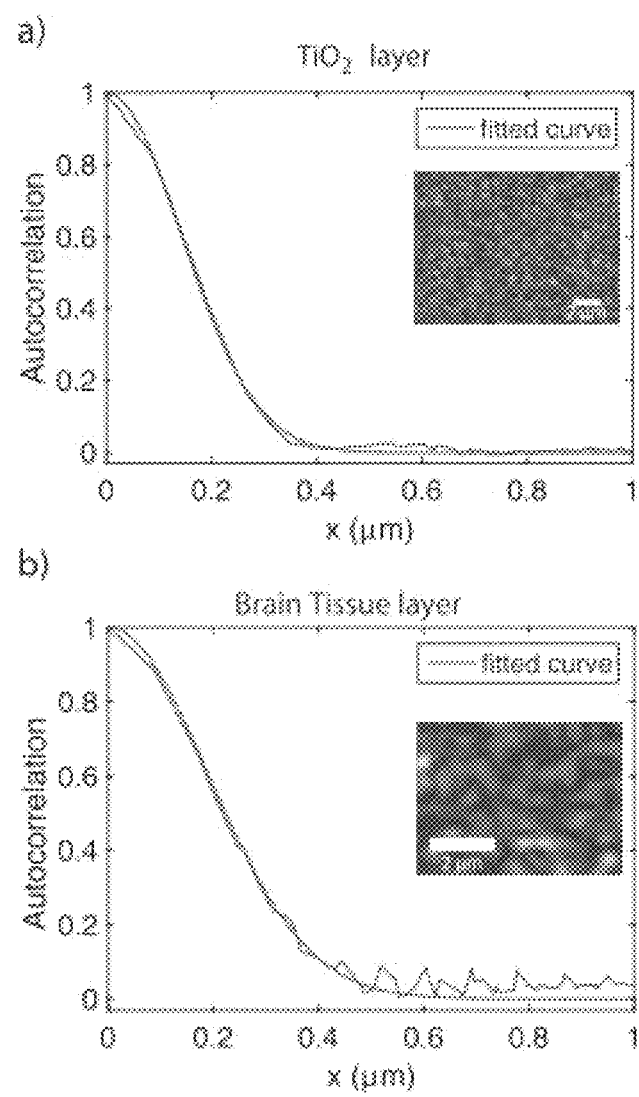
FIG. 6 shows autocorrelation graphs as a function of distance of the scattering sample already shown in the images of FIG. 4 and f the biological sample already shown in the images of FIG. 5 respectively.

Next, the speckle grain is superlocalized, i.e. the coordinates $(X_N, Y_N)$ in a xy plane and the intensity $I_N$ of the final corresponding light focus are optimized in a localization step by a fit with a Gaussian function with free center coordinates. At the end of the localization step an $F_N$ image is reconstructed containing a Gaussian intensity distribution with center coordinates $(X_{fN}, Y_{fN})$, intensity $I_{fN}$ and waist equal to the average size S of the speckle grain at optimized resolution in the sample. Therefore, knowledge of the size S of a speckle grain of a scattering sample is necessary to obtain the final high-resolution image of the method according to the invention. This size can be derived from the formula S=λ/n or can be calculated experimentally, for example from the autocorrelation of the intensity of G acquired images of speckle grains as a function of distance (as will be described later in relation to FIG. 6).

The steps of optimization of the configuration of wavefront, of subtraction, and of localization and reconstruction are then repeated for each one of the M target pixels belonging to the selected area.

Figure 3:
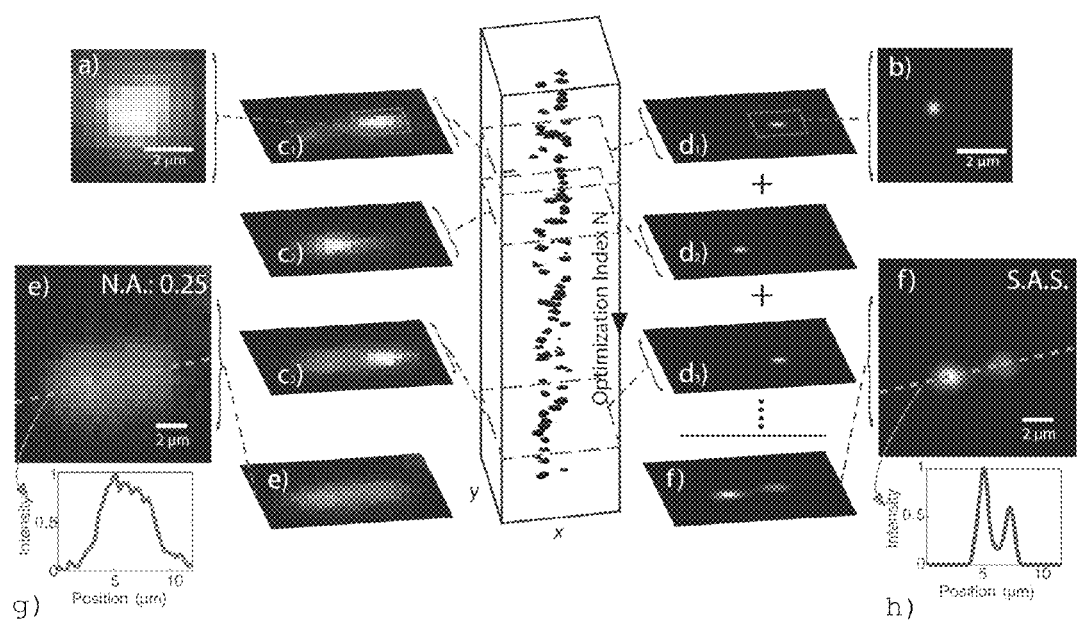

FIG. 3 shows the images resulting from the above-described steps of the method. Figures ($c_1$) (with a detail portion shown in (a)), ($c_2$), and ($c_3$) show images of the scattering sample with three different local maxima, obtained with the optimization step of the configuration of wavefront of the preferred embodiment of the method, for three different target pixels. Figures ($d_1$) (with a detail portion shown in (b)), ($d_2$), and ($d_3$) show images reconstructed from the steps of subtraction of the background image from the corresponding images ($c_1$), ($c_2$), and ($c_3$) and of localization by a Gaussian fit. The above-mentioned steps of the method are figuratively sketched in the central diagram of FIG. 3, in which the axis orthogonal to the plane xy represents the index N of the target pixel $P_N$. The final high resolution high-resolution image (f) of the scattering sample is obtained in the last step of the method in which all the information obtained from the N reconstructed images are reported in a single image. For comparison, it is also shown the image (e) obtained by summing the images of the optimized light foci with different configurations of the unit 10 of modulation, but not superlocalized, as well as the intensity profiles (g) and (h) of the images (e) and (f) along a line.

In the preferred embodiment of the method, the steps of optimizing, subtracting and localizing are implemented in sequence for each pixel N. In other embodiments, the optimization steps can be performed for each pixel N, then the steps of subtraction and localization can be implemented on each image outgoing the optimization steps, or the subtraction steps can be implemented on each image outgoing the optimization steps and then the localization steps can be implemented for each image resulting from the subtraction steps.

Figure 4:
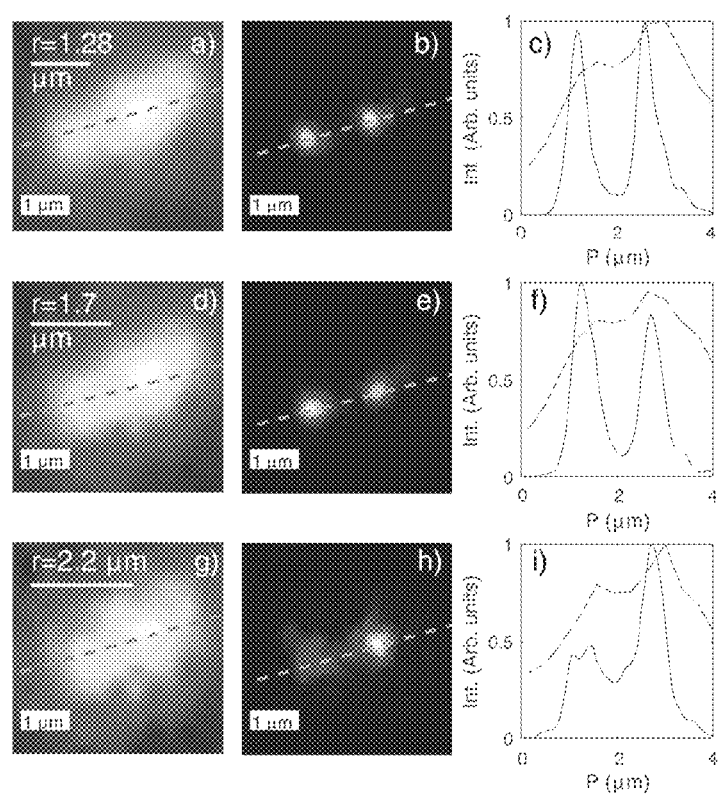
FIG. 4 shows images (a), (d) and (g) of a second known scattering sample obtained by a standard fluorescence microscopy method varying the numerical aperture NA of the collection optics and the corresponding images (b), (e), and (h) obtained by the preferred embodiment of the method of FIGS. 2 and 3, and compares the different intensity profile (c), (f) and (i) along a same dashed line.

The inventors of the present invention have carried out experiments which have demonstrated the reliability of the preferred embodiment of the method described in relation to FIG. 3, using the apparatus of FIG. 1. FIG. 4 shows the results of a first experiment on two commercial fluorescent beads (0.5 μm in diameter, Spherotech FP-00556-2) seated on a sample of a layer of titanium dioxide (used in the experiment previously described with reference to FIG. 2). FIG. 4a shows a first image acquired with a low numerical aperture NA and low optical resolution r equal to about 1.3 μm without applying the method according to the invention. FIG. 4b shows the corresponding reconstructed image obtained by applying the method according to the present invention with the same numerical aperture NA of the objective. In the image of FIG. 4a, the two fluorescent beads appear as a single elongated structure, by contrast the reconstructed image of FIG. 4b the two fluorescent beads appear separate and clearly distinguishes. FIG. 4c illustrates intensity profiles along a same dashed line l shown along the two fluorescent beads of FIGS. 4a and 4b. From FIGS. 4b, 4c, a resolution of the images obtained by the method according to the invention is calculated equal to about 150 nm that is consistent with the expected size of the speckle grain in the scattering titanium dioxide sample.

By decreasing the numerical aperture NA of the objective and the optical resolution r (closing the diaphragm, the optical resolution r becomes first about 1.7 μm and then about 2.2 μm) the two fluorescent beads remain clearly distinguishable by implementing the method according to the invention, as shown by the images of FIGS. 4e and 4h and by the relative intensity profiles on the dashed line l of FIGS. 4f and 4i. For comparison, the images acquired with the same numerical apertures without implementing the method are shown in FIGS. 4d and 4g and the relative profiles on the same dashed line l are shown in FIGS. 4f and 4i.

Figure 5:
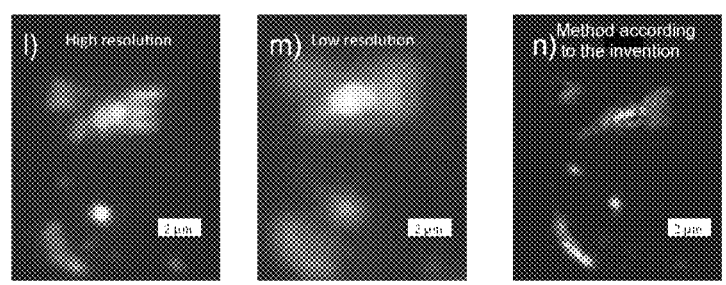
FIG. 5 shows images of a biological sample obtained by a standard fluorescence microscopy method (FIGS. 5*l* e 5*m*) and by the preferred embodiment of the method implemented by the apparatus of FIG. 1 and illustrated in FIG. 3 (FIG. 5*n*)

To demonstrate the feasibility of the method according to the present invention on standard semi-transparent biological systems, the inventors carried out a second experiment on brain slices derived from a mouse affected by Alzheimer's disease (3×Tg-AD) to detect the presence of plaques of Amyloid Beta, whose signal was detected using a secondary antibody conjugated with Nile red. The samples of animal origin were obtained in accordance with the European directive 2010/63/EU and with the related Italian legislative implementation decree n. 26 of Mar. 4, 2014. High resolution (obtained with a 0.75 NA objective) and low resolution (obtained by reducing NA to 0.21) images, and the images reconstructed implementing the method at low resolution (i.e. NA equal at 0.21), are shown respectively in FIGS. 5l, 5m and 5n.

The inventors have calculated a 200 nm resolution (consistent with the measured size S of the speckle grain in the sample), corresponding to an increase of six times compared to the theoretical resolution given by the collection optics. In the experiments whose results were reported in FIGS. 4 and 5, calculated values of the size S of a speckle grain of the scattering samples were used. The inventors collected G=100 images of speckle grains for a layer of $TiO_2$ (equal to that shown in the images of FIG. 4) and a slice of 250 μm of mouse brain affected by Alzheimer's disease (equal to that shown in the images of FIG. 5). They calculated the autocorrelations of the intensities as a function of distance, whose graphs are shown in FIGS. 6a and 6b respectively. Through a Gaussian fit of the central maxima of the autocorrelation functions, the values of the size S of the speckle grains were obtained, respectively equal to $S_{TiO2}=146\pm3$ nm and $S_{brain}=195\pm7$ nm.

In the foregoing the preferred embodiments have been described and variants have been suggested of the present invention, but it should be understood that those skilled in the art can make variations and changes, without so departing from the scope of protection thereof, as defined by the attached claims.

What is claimed is:

1. Fluorescence microscopy method comprising the following steps:
   A. illuminating a scattering sample including one or more fluorescent emitters with a coherent excitation light beam having a wavefront with a first initial configuration $C_1$ for exciting said one or more fluorescent emitters comprised in the scattering sample;
   B. acquiring a first initial image $F^1$ corresponding to a background image $F^1=F_B$ of the scattering sample, through a pixel imaging unit, obtaining a speckle grain image;
   C. selecting M target pixels $P_N$, with N=1, . . . , M, of coordinates $[x_N, y_N]$ belonging to an area of the first initial image $F^1$ having fluorescence signals of at least one fluorescent emitters, each one of the M target pixels $P_N$ having a first initial intensity $I_{PN}^1$;
   D. optimising the first initial configuration of the wavefront for each one of the M target pixels $P_N$, for decreasing the speckle grain size of the first initial image $F^1$ and obtaining a final image $F^{fin}(I_{PN}^{max})$ of the scattering sample with a local maximum $I_{PN}^{max}$ of the fluorescence signal corresponding to a maximum intensity of the target pixels $P_N$;
   E. subtracting the first initial image $F_B$ of background, obtained at step B, from the final image $F^{fin}(I_{PN}^{max})$, obtained at step D, for each one of the M target pixels $P_N$, obtaining an image $F_{speckle(PN)}$ having only fluorescent signals coming from a speckle grain located at pixel $[x_N, y_N]$ with intensity $I_{PN}^{speckle}$, for each one of the M target pixels $P_N$;
   F. fitting the image $F_{speckle(PN)}$, obtained at step E, with a Gaussian function with free center coordinates, for each one of the M target pixels $P_N$, thereby obtaining coordinates $(X_N, Y_N)$ and intensity $I_N$ in a xy plane;
   G. generating an image $F_N$ containing a Gaussian distribution centered at coordinates $(X_N, Y_N)$ and with intensity $I_N$, obtained at step F, and with a waist equal to an average size S of speckle grain of the scattering sample, for each one of the M target pixels $P_N$; and
   H. generating a final image of the sample by summing the M images $F_N$ obtained at step G, for each one of the M target pixels $P_N$.

2. The fluorescence microscopy method according to claim 1, wherein step D comprises, for each one of the M target pixels $P_N$, the following substeps:
   D.1—setting the first initial configuration $C^1$ of the wavefront as a reference configuration $C^1=C^{ref}$ of the wavefront, the first initial image $F^1$ as a reference image $F^1=F^{ref}$, and a first intensity $I_{PN}^1$ at the target pixel PN of the first initial image $F^1$ as a reference intensity $I_{PN}^1=I_{PN}^{ref}$ at the target pixel $P_N$;
   D.2—repeating T times, with T>1, the following cycle of substeps:
      D.2.1—varying the reference configuration $C^{ref}$ of the wavefront through an amplitude and/or phase modulation unit so as to obtain an i-th configuration $C^i$ of the wavefront;
      D.2.2—acquiring an i-th image $F^i$ with an i-th intensity $I_{PN}^i$ at the target pixel $P_N$;
      D.2.3—checking whether the i-th intensity $I_{PN}^i$ value at the target pixel $P_N$ is greater than the reference intensity $I_{PN}^{ref}$ thereby:
         if $I_{PN}^i > I_{PN}^{ref}$, then the i-th configuration $C^i$ of the wavefront obtained at step D.2.1 is accepted as the reference configuration $C^{ref}$ of the wavefront, i.e. $C^{ref}=C^i$, and $F^{ref}=F^i$ and $I_{PN}^{ref}=I_{PN}^i$ are set, else
         if $I_{PN}^i < I_{PN}^{ref}$, then the i-th configuration $C^i$ of the wavefront obtained at step D.2.1 is not accepted, and the reference configuration $C^{ref}$ of the wavefront before the variation performed at step D.2.1 is restored;
   D.3—setting the reference image $F^{ref}$ as the final image $F^{ref}=F^{fin}(I_{PN}^{max})$ and the reference intensity $I_{PN}^{ref}$ as a local maximum $I_{PN}^{max}$ of florescence signal at the target pixel $P_N$.

3. The fluorescence microscopy method according to claim 2, wherein the amplitude and/or phase modulation unit is a digital micromirror device comprising a p×q matrix of micromirrors and the step D.2.1 is implemented by varying the orientation of Q≥1 micromirrors of the digital micromirror device, thereby Q≤p×q, wherein each micromirror would take on V>2 orientations, so that T=V×Q.

4. The fluorescence microscopy method according to claim 1, wherein the average size S of the speckle grain of the scattering sample is set equal to $\lambda/2n$, where $\lambda$ is a wavelength of the excitation light and n is a refractive index of the sample.

5. The fluorescence microscopy method according to claim 1, wherein the average size S of the speckle grain of the scattering sample is computed by measures of sample image intensity autocorrelation, as a function of distance.

6. The fluorescence microscopy method according to claim 1, comprising a step for de-magnifying the coherent excitation light beam, before step A.

7. Fluorescence microscopy apparatus comprising a wavefront modulation unit, configured to receive and to amplitude and/or phase modulate an excitation light beam, the apparatus being configured to illuminate a sample by the excitation light beam modulated by the wavefront modulation unit, wherein the apparatus further comprises an imaging unit, configured to receive and acquire a fluorescent beam emitted from the sample, and a control unit connected to the wavefront modulation unit and to the imagining unit, wherein the apparatus is configured to implement a fluorescence microscopy method comprising the following steps:

A. illuminating a scattering sample including one or more fluorescent emitters with a coherent excitation light beam having a wavefront with a first initial configuration $C^1$ for exciting said one or more fluorescent emitters comprised in the scattering sample;

B. acquiring a first initial image $F^1$ corresponding to a background image $F^1 = F_B$ of the scattering sample, through a pixel imaging unit, obtaining a speckle grain image;

C. selecting M target pixels $P_N$, with $N=1, \ldots, M$, of coordinates $[x_N, y_N]$ belonging to an area of the first initial image $F^1$ having fluorescence signals of at least one fluorescent emitters, each one of the M target pixels $P_N$ having a first initial intensity $I_{PN}^1$;

D. optimising the first initial configuration of the wavefront for each one of the M target pixels $P_N$, for decreasing the speckle grain size of the first initial image $F^1$ and obtaining a final image $F^{fin}(I_{PN}^{max})$ of the scattering sample with a local maximum $I_{PN}^{max}$ of the fluorescence signal corresponding to a maximum intensity of the target pixels $P_N$;

E. subtracting the first initial image $F_B$ of background, obtained at step B, from the final image $F^{fin}(I_{PN}^{max})$, obtained at step D, for each one of the M target pixels $P_N$, obtaining an image $F_{speckle(PN)}$ having only fluorescent signals coming from a speckle grain located at pixel $[x_N, y_N]$ with intensity $I_{PN}^{speckle}$, for each one of the M target pixels $P_N$;

F. fitting the image $F_{speckle(PN)}$, obtained at step E, with a Gaussian function with free center coordinates, for each one of the M target pixels $P_N$, thereby obtaining coordinates $(X_N, Y_N)$ and intensity $I_N$ in a xy plane;

G. generating an image $F_N$ containing a Gaussian distribution centered at coordinates $(X_N, Y_N)$ and with intensity $I_N$, obtained at step F, and with a waist equal to an average size S of speckle grain of the scattering sample, for each one of the M target pixels $P_N$;

H. generating a final image of the sample by summing the M images $F_N$ obtained at step G, for each one of the M target pixels $P_N$, thereby the control unit is configured to control the wavefront modulation unit according to step D, based on the fluorescent beam acquired by the imaging unit.

8. The fluorescence microscopy apparatus according to claim 7, wherein the wavefront modulation unit is a Digital Micromirror Device, DMD.

9. The fluorescence microscopy apparatus according to claim 7 configured to implement the method according to claim 6, comprising a coherent excitation light beam de-magnifying unit.

* * * * *